(12) United States Patent
Ishii et al.

(10) Patent No.: US 11,181,147 B2
(45) Date of Patent: Nov. 23, 2021

(54) SLIDING BEARING

(71) Applicant: OILES CORPORATION, Tokyo (JP)

(72) Inventors: Yuta Ishii, Fujisawa (JP); Kouichi Morishige, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 16/771,898

(22) PCT Filed: Nov. 27, 2018

(86) PCT No.: PCT/JP2018/043641
§ 371 (c)(1),
(2) Date: Jun. 11, 2020

(87) PCT Pub. No.: WO2019/116887
PCT Pub. Date: Jun. 20, 2019

(65) Prior Publication Data
US 2021/0071712 A1    Mar. 11, 2021

(30) Foreign Application Priority Data
Dec. 12, 2017  (JP) .............................. JP2017-238167

(51) Int. Cl.
*F16C 33/10*   (2006.01)
*F16C 17/04*   (2006.01)
*F16C 33/74*   (2006.01)

(52) U.S. Cl.
CPC .......... *F16C 33/1065* (2013.01); *F16C 17/04* (2013.01); *F16C 33/74* (2013.01)

(58) Field of Classification Search
CPC ...... F16C 17/04; F16C 17/045; F16C 17/047; F16C 17/08; F16C 33/1065; F16C 33/20;
(Continued)

(56) References Cited

U.S. PATENT DOCUMENTS 8,740,233 B2 * 6/2014 Morishige ............... F16C 33/20
                                              280/124.155
9,194,435 B2 * 11/2015 Miyata ..................... F16C 33/74
(Continued)

FOREIGN PATENT DOCUMENTS

CN          101449068 A    6/2009
CN          201277258 Y    7/2009
(Continued)

OTHER PUBLICATIONS

International Search Report for PCT/JP2018/043641 dated Jan. 29, 2019, 5 pages.
(Continued)

*Primary Examiner* — James Pilkington
(74) *Attorney, Agent, or Firm* — Nixon & Vanderhye P.C.

(57) ABSTRACT

Provided is a sliding bearing capable of reducing the number of components and reducing costs. This sliding bearing (1) is provided with; an upper case (2); a lower case (3) combined with the upper case (2); and an annular dust seal-integrated center plate (8) that has a dust seal part (6) for covering a gap between the upper case (2) and the lower case (3), is disposed between the upper case (2) and the lower case (3), and enables relative rotation between the upper case (2) and the lower case (3). The dust seal-integrated center plate (8) is integrally formed with the lower case (3).

14 Claims, 10 Drawing Sheets

(58) Field of Classification Search
CPC .... F16C 33/208; F16C 33/74; F16C 2326/05; F16C 2220/04
See application file for complete search history.

(56) References Cited

U.S. PATENT DOCUMENTS

| | | | |
|---|---|---|---|
| 9,381,784 B2* | 7/2016 | Stautner | F16C 17/04 |
| 10,138,931 B2* | 11/2018 | Kurose | F16C 33/74 |
| 10,384,507 B2* | 8/2019 | Kurose | F16C 33/74 |
| 10,421,329 B2 | 9/2019 | Takahashi et al. | |
| 10,422,374 B2* | 9/2019 | Kurose | F16C 17/18 |
| 10,508,689 B2 | 12/2019 | Hamrodi et al. | |
| 2002/0061146 A1* | 5/2002 | Ono | F16C 33/1065 384/291 |
| 2009/0180719 A1 | 7/2009 | Miyata et al. | |
| 2014/0355915 A1* | 12/2014 | Saito | B60G 15/068 384/368 |
| 2015/0367698 A1 | 12/2015 | Stautner et al. | |
| 2017/0227057 A1 | 8/2017 | Hamrodi et al. | |
| 2018/0370317 A1 | 12/2018 | Takahashi et al. | |

FOREIGN PATENT DOCUMENTS

| | | | |
|---|---|---|---|
| CN | 103814226 A | | 5/2014 |
| CN | 104395626 A | | 3/2015 |
| DE | 10 2013 201 965 | | 8/2014 |
| DE | 10 2015 217 416 | | 10/2016 |
| DE | 10 2015 217 419 | | 3/2017 |
| EP | 2574481 | * | 4/2013 |
| EP | 3 401 561 | | 11/2018 |
| JP | 2-66718 | | 5/1990 |
| JP | 8-298747 A | | 11/1996 |
| JP | 2007-303613 | | 11/2007 |
| JP | 2008-095784 A | | 4/2008 |
| JP | 2017-53440 | | 3/2017 |
| JP | 2017-125598 A | | 7/2017 |
| WO | 2014/121772 A | | 8/2014 |
| WO | WO2016052106 | * | 4/2016 |
| WO | 2017/041798 A1 | | 3/2017 |
| WO | 2017/119409 | | 7/2017 |
| WO | WO2017119409 | * | 7/2017 |
| WO | WO2019116952 | * | 6/2019 |

OTHER PUBLICATIONS

Search Report dated Jul. 21, 2021 issued in Chinese Application No. 201880078312.0 with English translation (5 pages).
Extended European Search Report dated Aug. 12, 2021 issued in European Application No. 18887299.8 (9 pages).

* cited by examiner

Fig.5
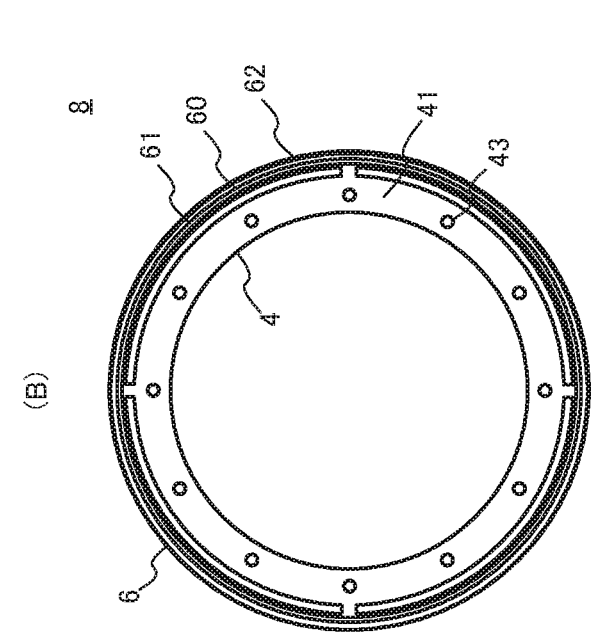
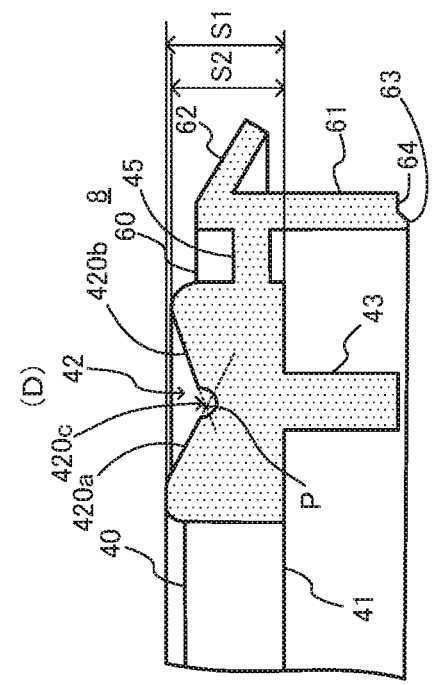
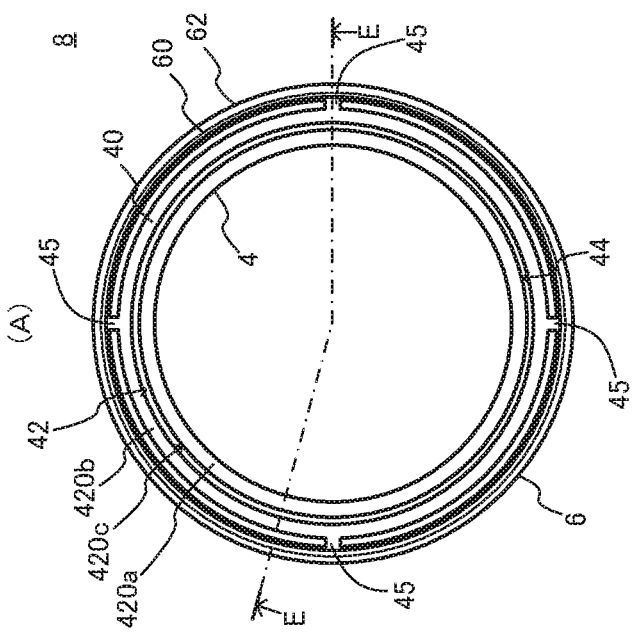
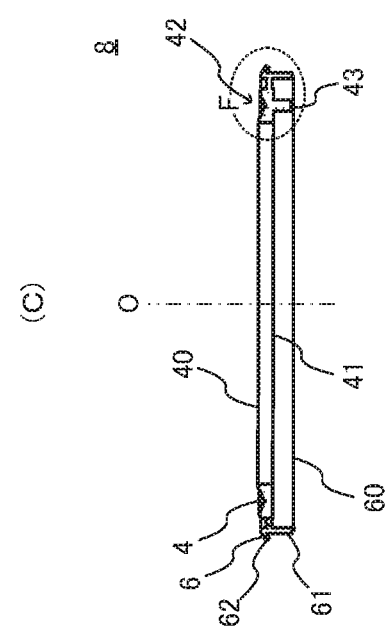

SLIDING BEARING

This application is the U.S. national phase of International Application No. PCT/JP2018/043641 filed Nov. 27, 2018 which designated the U.S. and claims priority to JP Patent Application No. 2017-238167 filed Dec. 12, 2017, the entire contents of each of which are hereby incorporated by reference.

TECHNICAL FIELD

The present invention relates to a sliding bearing for supporting a load, and in particular to a sliding bearing of synthetic resin for supporting a load applied to a shaft member of a vehicle's suspension or the like.

BACKGROUND ART

A strut type suspension used for a front wheel of an automobile has combination structure of a piston rod, a shock absorber, and a coil spring. When a steering is operated, the shock absorber is rotated together with the coil spring. Accordingly, to support a load applied to the strut type suspension while allowing smooth rotation of the shock absorber and the coil spring, usually a bearing is placed between an upper mount, i.e. amounting mechanism for mounting the strut assembly onto the automobile body, and an upper spring seat, i.e. a spring seat for supporting the upper end of the coil spring.

For example, the Patent Literature 1 discloses a sliding bearing of synthetic resin for a strut type suspension. This sliding bearing comprises: an upper case, which is mounted on the side of an upper mount; a lower case, which is mounted on the side of an upper spring seat and is rotatably combined with the upper case; and a center plate, which is placed in an annular space that is formed by combination of the upper case and the lower case, and which is formed integrally with a dust seal so as to prevent intrusion of dust into the annular space.

CITATION LIST

Patent Literature

Patent Literature 1: Japanese Unexamined Patent Application Laid-Open No. 2017-053440

SUMMARY OF INVENTION

Technical Problem

The sliding bearing described in the Patent Literature 1 comprises the upper case, the lower case, and the center plate, which are separate components, and is fabricated by assembling these separately-formed components. Accordingly, the number of components is large, assembly costs becomes higher, and defective goods are produced by forgetting to incorporate some component, especially a center plate. Further, management costs of components become higher as the number of components becomes larger.

The present invention has been made taking the above conditions into consideration, and an object of the present invention is to provide a sliding bearing that can reduce costs by reducing the number of components.

Solution to Problem

To solve the above problems, the present invention forms a center plate integrally with a lower case or an upper case.

For example, the present invention provides a sliding bearing for supporting a load, comprising:
an upper case;
a lower case, which is combined with the upper case; and
an annular center plate, which is placed between the upper case and the lower case, so as to realize relative rotation between the upper case and the lower case, wherein:
the center plate is formed integrally with the lower case or the upper case.

Advantageous Effects of Invention

According to the present invention, since the center plate is formed integrally with the lowercase or the upper case, it is possible to reduce the number of components of the sliding bearing and thereby to reduce assembly costs of the sliding bearing and the management costs of the components of the sliding bearing. Further, it is possible to prevent occurrence of defective goods owing to forgetting to incorporate the center plate

BRIEF DESCRIPTION OF DRAWINGS

FIGS. 5(A) and 5(B) are respectively a plan view and a bottom view of a dust-seal-integrated center plate 8, FIG. 5(C) is an E-E cross-section view of the dust-seal-integrated center plate 8 shown in FIG. 5(A), and FIG. 5(D) is an enlarged view of the part F of the dust-seal-integrated center plate 8 shown in FIG. 5(C);

DESCRIPTION OF EMBODIMENTS

In the following, one embodiment of the present invention will be described.

Figure 1:
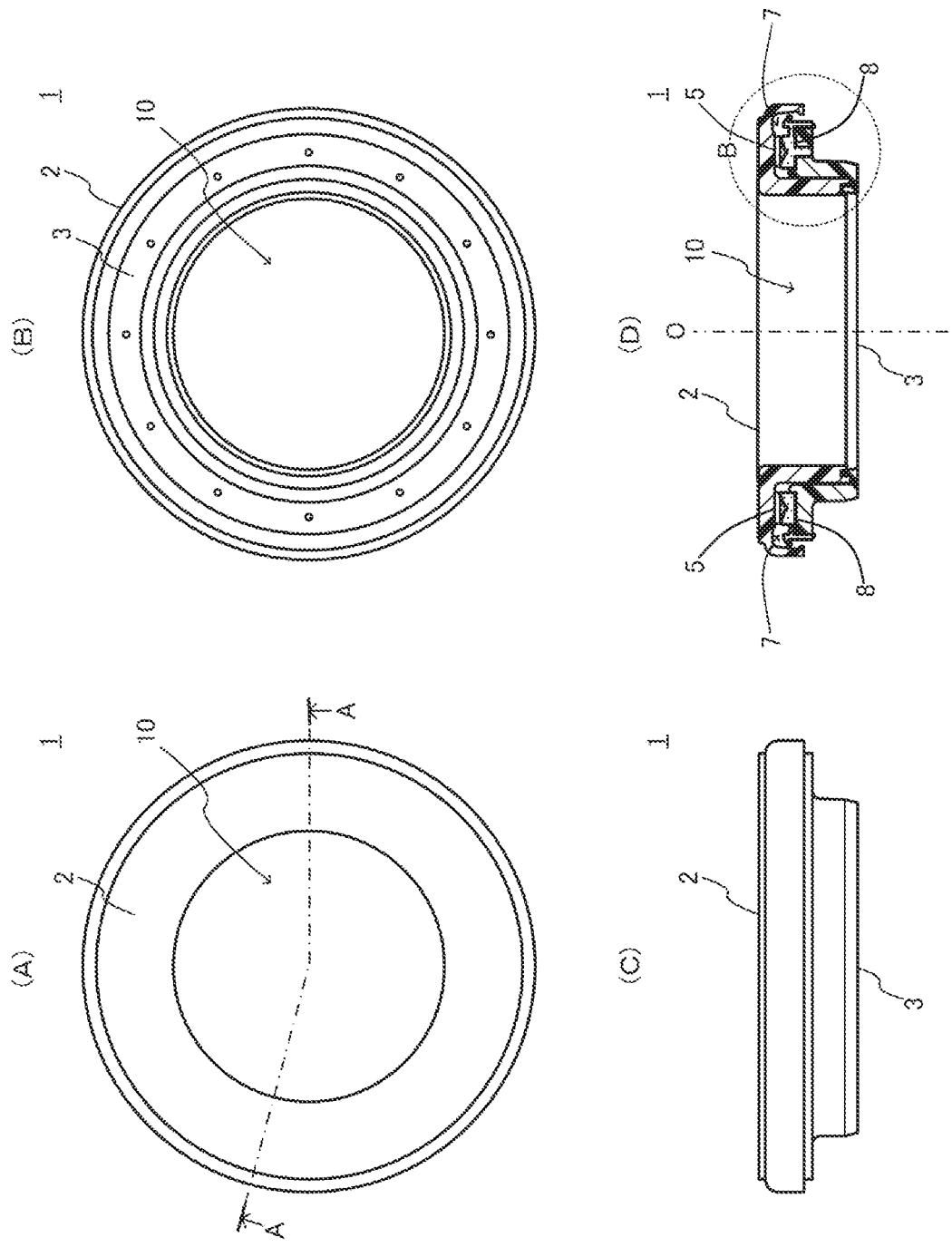
FIGS. 1(A), 1(B), and 1(C) are respectively a plan view, a bottom view, and a front view of a sliding bearing 1 according to one embodiment of the present invention.
FIG. 1(D) is an A-A cross-section view of the sliding bearing 1 shown in FIG. 1(A)
Figure 2:
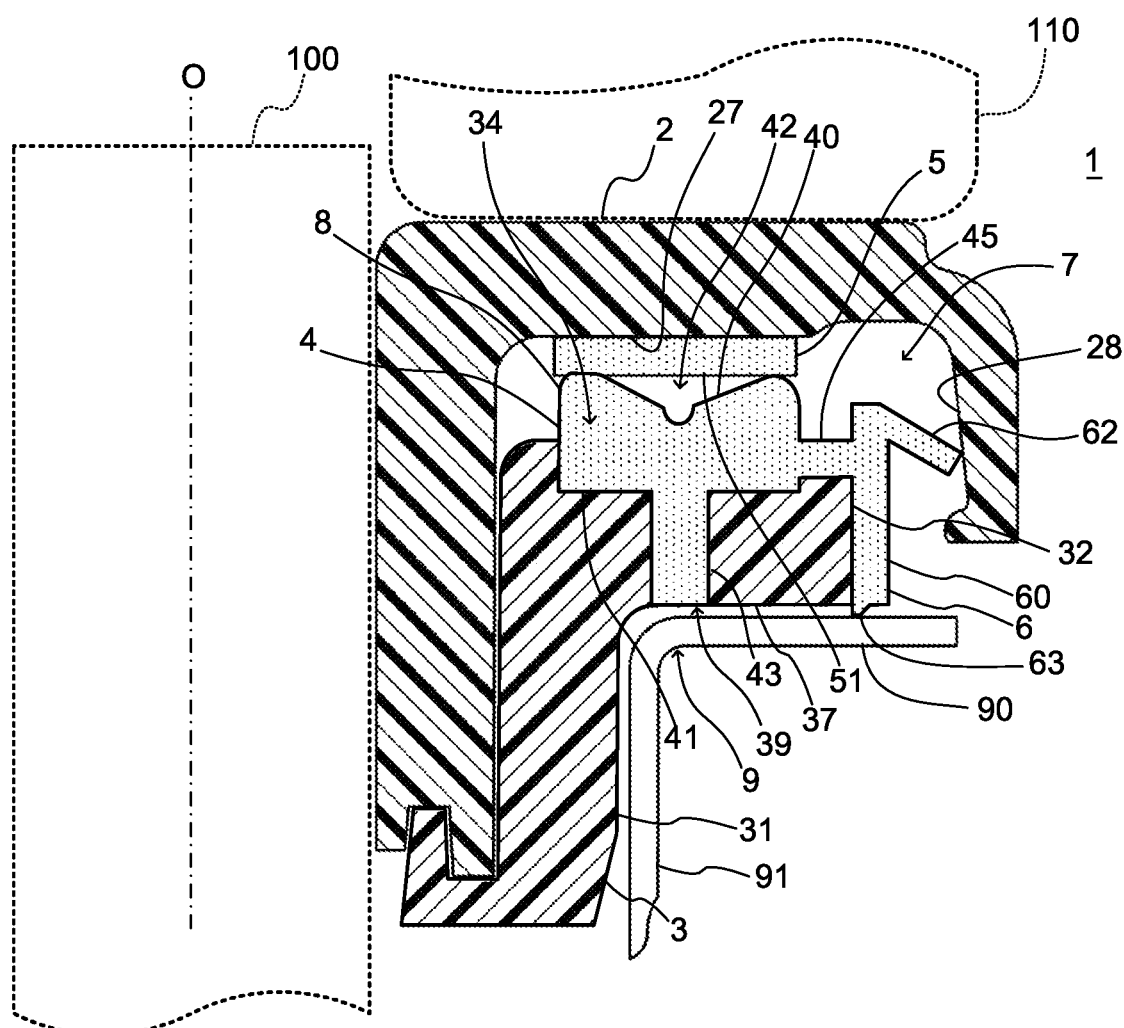
FIG. 2 is an enlarged view of the part B of the sliding bearing 1 shown in FIG. 1(D)

FIGS. 1(A), 1(B) and 1(C) are respectively a plan view, a bottom view, and a front view of a sliding bearing 1 according to one embodiment of the present invention, and FIG. 1(D) is an A-A cross-section view of the sliding bearing 1 shown in FIG. 1(A). Further, FIG. 2 is an enlarged view of the part B of the sliding bearing 1 shown in FIG. 1(D).

The sliding bearing 1 of the present embodiment has a receiving hole 10 for receiving a shock absorber 100 of a suspension (for example, strut type suspension) of a vehicle, and supports a load of a vehicle body applied to the suspension while allowing rotation of the shock absorber 100 received in the receiving hole 10.

As shown in the figures, the sliding bearing 1 comprises: an upper case 2; a lower case 3, which is rotatably combined with the upper case 2, to form an annular space 7 between the lower case 3 and the upper case 2; a dust-seal-integrated center plate 8 and an annular sliding sheet 5, which are placed in the annular space 7; and, although not shown, lubricant such as lubricating grease held on the dust-seal-integrated center plate 8.

The upper case 2 is formed of synthetic resin such as polyacetal resin, polyamide resin, or polybutylene terephthalate resin, impregnated with lubricating oil to improve sliding characteristics as needed. The upper case 2 is mounted on an upper mount 110, which is a mounting mechanism for mounting the suspension onto the vehicle body, in a state that the shock absorber 100 of the suspension is inserted in the upper case 2.

Figure 3:
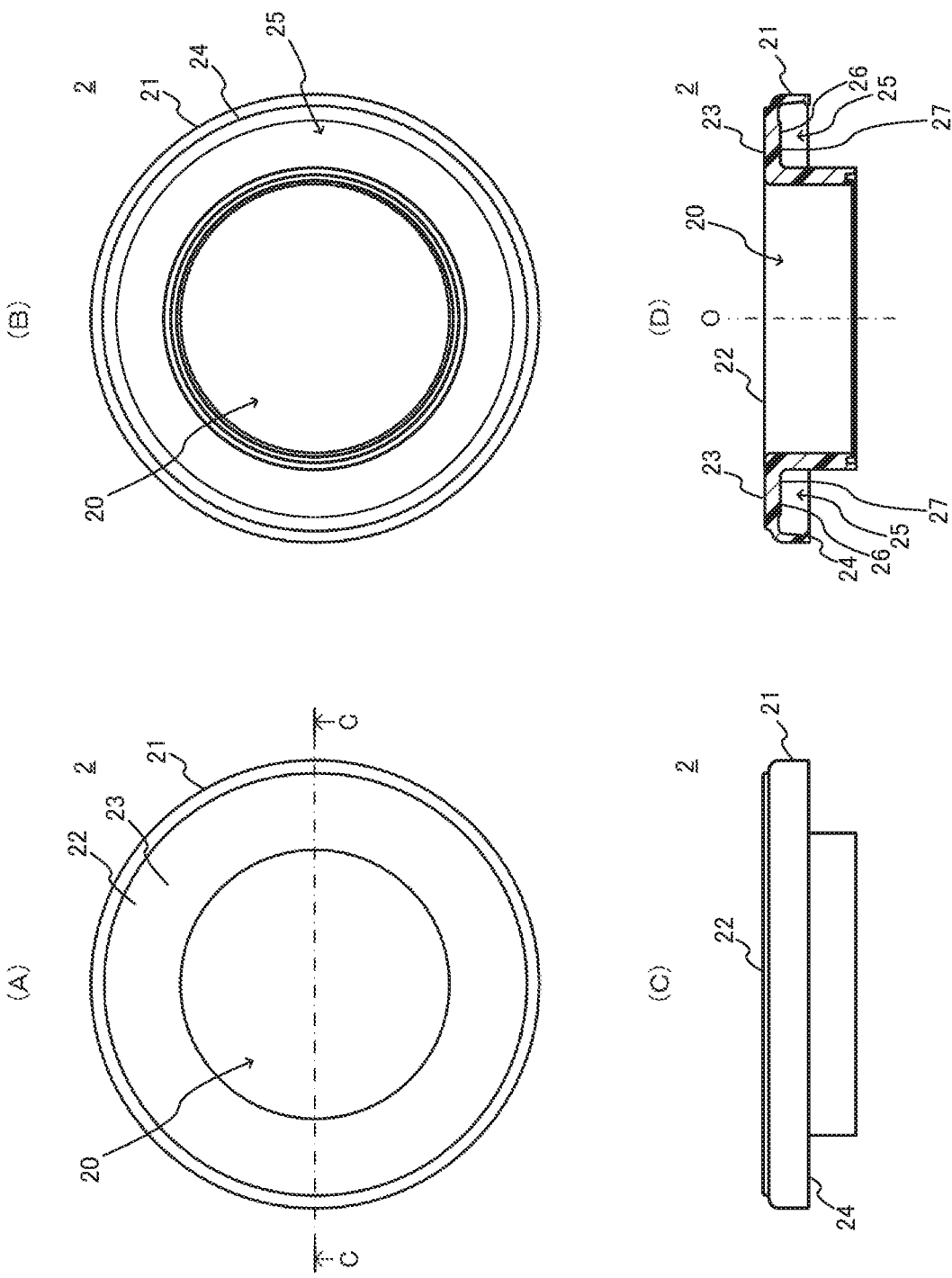
FIGS. 3(A), 3(B), and 3(C) are respectively a plan view, a bottom view, and a front view of an upper case 2.
FIG. 3(D) is a C-C cross-section view of the upper case 2 shown in FIG. 3(A)

FIGS. 3(A), 3(B), and 3(C) are respectively a plan view, a bottom view, and a front view of the upper case 2, and FIG. 3(D) is a C-C cross-section view of the upper case shown in FIG. 3(A).

As shown in the figures, the upper case 2 comprises: an annular upper case body 21 having an insertion hole 20 for inserting the shock absorber 100; an attaching surface 23, which is formed in the upper surface 22 of the upper case body 21 so as to attach the sliding bearing 1 to the upper mount 110; and an annular recess 25, which is formed in the lower surface 24 of the upper case body 21, so as to form the annular space 7 when the upper case 2 is rotatably combined with the lower case 3.

A load transmission surface 27 is formed in the bottom surface 26 of the annular recess 25, and becomes the upper surface of the annular space 7. The load transmission surface 27 transmits the load of the vehicle body, which is applied to the suspension, to the sliding sheet 5 and to the below-described center plate part 4 of the dust-seal-integrated center plate 8.

The lower case 3 is formed of synthetic resin such as polyacetal resin, polyamide resin, or polybutylene terephthalate resin. In a state that the shock absorber 100 of the suspension is inserted in the lower case 3, the lower case 3 is attached to an upper spring seat 9 (See FIG. 2) that supports the upper end of a coil spring (not shown) of the suspension.

FIGS. 4(A), 4(B), and 4(C) are respectively a plan view, a bottom view, and a front view of the lower case 3, and FIG. 4(D) is a D-D cross-section view of the lower case 3 shown in FIG. 4(A).

As shown in the figures, the lower case 3 comprises: a tubular lower case body 31 having an insertion hole 30 for inserting the shock absorber 100; a flange part 32, which is formed on the side of the upper end 35 of the lower case body 31, to protrude outward in the radial direction from the outer peripheral surface 36 of the lower case body 31; an annular recess 34, which is formed in the upper surface 33 of the flange part 32 and, when the lower case 3 is combined with the upper case 2, is received in the annular recess 25 formed in the lower surface 24 of the upper case body 21 of the upper case 2, to form the annular space 7; a plurality of through-holes 39, which are formed to be arranged in the circumferential direction, each passing through from the bottom surface 38 of the annular recess 34 to the lower surface 37 of the flange part 32; and a plurality of cutouts 340, which are arranged in the circumferential direction, each passing through a side wall of the flange part 32 from the annular recess 34. The lower surface 37 of the flange part 32 is opposed to the upper spring seat 9 and supports the upper spring seat 9.

Figure 4:
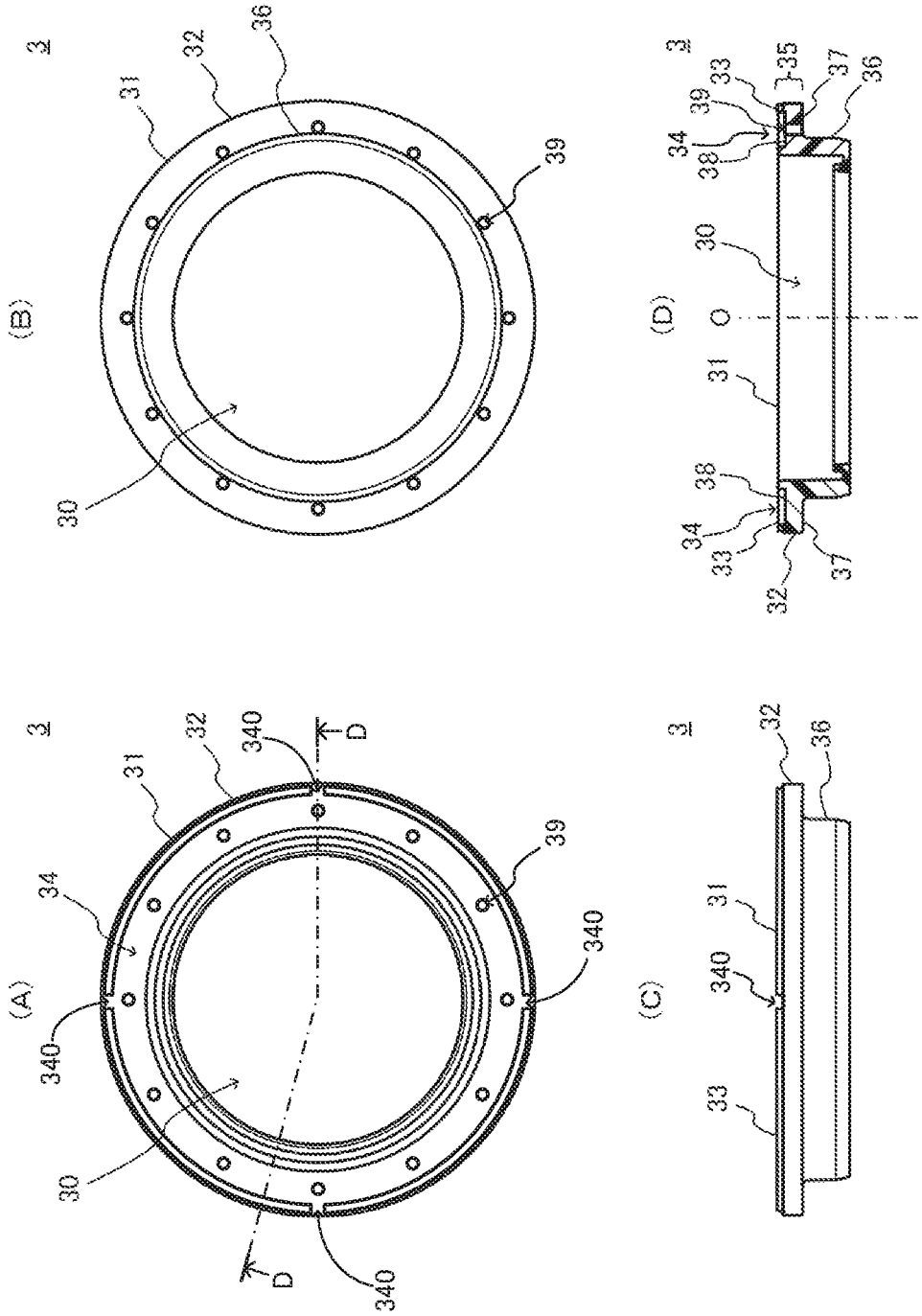
FIGS. 4(A), 4(B), and 4(C) are respectively a plan view, a bottom view, and a front view of a lower case 3.
FIG. 4(D) is a D-D cross-section view of the lower case 3 shown in FIG. 4(A)

Although, in the present embodiment, each of the through-holes 39 has a circular column shape, the through-holes 39 may have a shape of a rectangular column, a circular truncated cone, or a truncated pyramid. In FIG. 4, only some of the through-holes 39 are given the reference numeral for the sake of simplicity of the figure.

The dust-seal-integrated center plate 8 is an elastic body superior in sliding characteristics and formed integrally with the lower case 3 by the two-color molding or the insert molding. As the material of the dust-seal-integrated center plate 8, synthetic resin elastomer such as polyolefin resin elastomer, polyamide resin elastomer, polyester resin elastomer, polystyrene resin elastomer, or polyurethane resin elastomer, is used with lubricant such as polytetrafluoroethylene (PTFE), lubricating oil, or silicone being added as needed.

FIGS. 5(A) and 5(B) are respectively a plan view and a bottom view of the dust-seal-integrated center plate 8, FIG. 5(C) is an E-E cross-section view of the dust-seal-integrated center plate 8 shown in FIG. 5(A), and FIG. 5(D) is an enlarged view of the part F of the dust-seal-integrated center plate 8 shown in FIG. 5(C).

As shown in the figures, the dust-seal-integrated center plate 8 is an annular body, and comprises: a center plate part 4; a dust seal part 6; and a plurality of arm parts 45, which are to be positioned in the cutouts 340 of the annular recess 34 of the lower case 3, and connect the center plate part 4 and the dust seal part 6.

The center plate part 4 is placed in the annular recess 34 formed in the upper surface 33 of the flange part 32 of the lower case 3, and supports the vehicle body's load applied to the suspension, via the load transmission surface 27 of the annular recess 25 of the upper case 2 and the sliding sheet 5 while allowing rotation between the upper case 2 and the lower case 3 (See FIG. 2).

The center plate part 4 comprises: a bearing surface 40, which supports a load applied via the load transmission surface 27 of the annular recess 25 of the upper case 2 and the sliding sheet 5; a back surface 41, which is a surface positioned on the opposite side to the bearing surface 40; an annular groove 42, which is formed in the bearing surface 40 so as to hold lubricant such as lubricating grease; and a plurality of protrusions 43, which are formed in the back surface 41 along the circumferential direction.

The back surface 41 is a flat surface that faces and comes in contact with the bottom surface 38 of the annular recess 34 of the lower case 3.

The protrusions 43 have shapes conformed to the respective through-holes 39 of the lower case 3, and are placed into the respective through-holes 39. In FIG. 5, only some of the protrusions 43 are given the reference numeral for the sake of simplicity of the figure.

The annular groove 42 comprises: an inner peripheral surface 420a, which is inclined outward in the radial direction from the opening side toward the groove bottom side;

an outer peripheral surface 420*b*, which is inclined inward in the radial direction from the opening side toward the groove bottom side; and an annular recess 420*c*, which is formed at the intersection P of the inner peripheral surface 420*a* and the outer peripheral surface 420*b*. Here, the intersection P of the inner peripheral surface 420*a* and the outer peripheral surface 420*b* is positioned close to the side of the bearing surface 40 than the back surface 41. Further, the thickness (i.e. distance from the back surface 41) S1 at the opening-side end of the inner peripheral surface 420*a* is larger than the thickness (distance from the back surface 41) S2 at the opening-side end of the outer peripheral surface 420*b*.

The dust seal part 6 is fitted to the flange part 32 of the lower case body 31 of the lower case 3, to close the gap leading to the annular space 7 between the upper case 2 and the lower case 3. This prevents intrusion of dust into the annular space 7.

The dust seal part 6 comprises: a tubular dust seal body 60, which is fitted to the flange part 32 of the lower case body 31 of the lower case 3; an annular lip part 62, which extends outward in the radial direction from the outer peripheral surface 61 of the dust seal body 60; and an annular protrusion 63, which protrudes in the axial direction from the lower end surface 64 of the dust seal body 60.

The lip part 62 is abutted against an outer-peripheral-side inner wall 28 of the annular recess 25 of the upper case 2 in a state that the dust seal body 60 is fitted to the flange part 32 of the lower case body 31 of the lower case 3. As a result, the gap leading to the annular space 7 between the upper case 2 and the lower case 3 is closed, preventing intrusion of dust into the annular space 7 (See FIG. 2).

The annular protrusion 63 protrudes downward in the direction of the axis O from the lower surface 37 of the flange part 32 in a state that the dust seal body 60 is fitted to the flange part 32 of the lower case body 31 of the lower case 3, so as to be abutted against the upper spring seat 9 attached to the lower surface 37 of the flange part 32. As a result, the gap between the lower surface 37 of the flange part 32 and the upper spring seat 9 is closed, preventing intrusion of dust into the gap (See FIG. 2).

The sliding sheet 5 is a sliding member placed between the bearing surface 40 of the center plate part 4 of the dust-seal-integrated center plate 8 and the load transmission surface 27 of the upper case 2. The sliding sheet 5 is formed of synthetic resin such as fluorine resin such as PTFE or modified PTFE obtained by copolymerizing tetrafluoroethylene (TFE) with a slight amount of another material (comonomer), polyacetal resin, polyethylene resin, polyamide resin, or polyphenylene sulfide resin, and, if needed, lubricant such as PTFE (excepting the case where thermoplastics is PTFE or modified PTFE), lubricating oil, silicone, or graphite is added to improve the sliding characteristics. Further, if needed, reinforcing material such as aramid fiber, glass fiber, or carbon fiber is added to improve strength. Or, the sliding sheet 5 may be formed of metal superior in sliding characteristics such as brass alloy.

Figure 6:
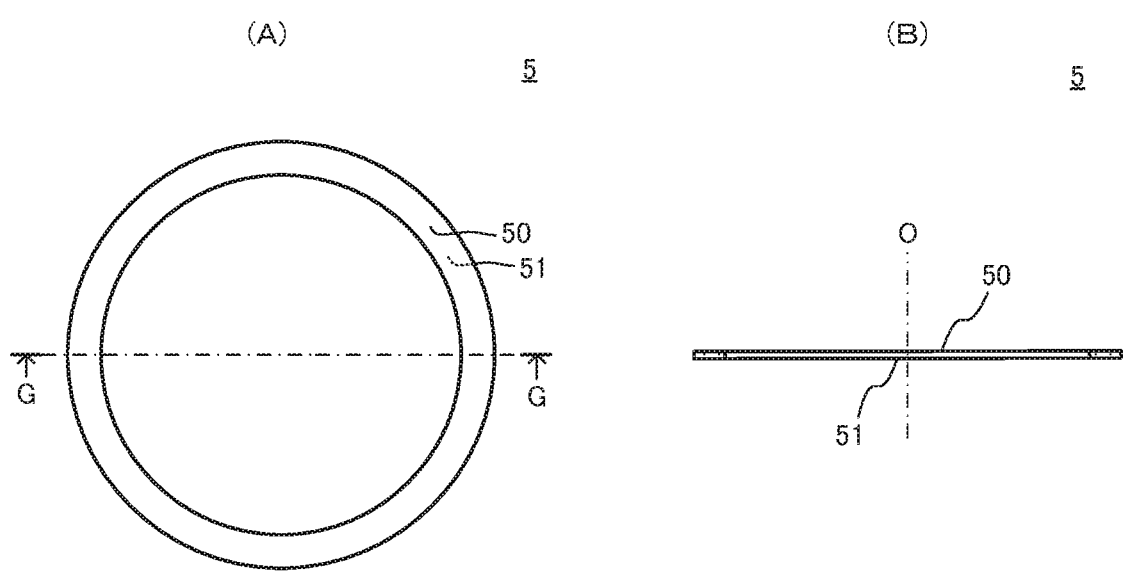
FIG. 6(A) is a plan view of a sliding sheet 5 and FIG. 6(B) a G-G cross-section view of the sliding sheet 5 shown in FIG. 6(A)

FIG. 6(A) is a plan view of the sliding sheet 5, and FIG. 6(B) is a G-G cross-section view of the sliding sheet 5 shown in FIG. 6(A).

As shown in the figures, the sliding sheet 5 is an annular body formed to have a flat plate shape in cross-section with respect to the direction of the axis O. The sliding sheet 5 has: a contact surface 50, which comes in contact with the load transmission surface 27 of the annular recess 25 of the upper case 2; and a sliding surface 51, which is positioned on the side opposite to the contact surface 50 and comes in sliding contact with the bearing surface 40 of the center plate part 4 of the dust-seal-integrated center plate 8. Since the sliding surface 51 of the sliding sheet 5 comes in sliding contact with the bearing surface 40 of the center plate part 4 of the dust-seal-integrated center plate 8, free rotation is allowed between the upper case 2 and the lower case 3.

The sliding bearing 1 of the above-described configuration is assembled by placing the sliding sheet 5 on the bearing surface 40 of the center plate part 4 of the dust-seal-integrated center plate 8 formed integrally with the lower case 3 in such a way that the sliding surface 51 of the sliding sheet 5 faces the bearing surface 40, and then by combining the upper case 2 with the lower case 3 in such a way that the contact surface 50 of the sliding sheet 5 faces the load transmission surface 27 of the annular recess 25 of the upper case 2.

Hereinabove, one embodiment of the present invention has been described.

In the present embodiment, the dust-seal-integrated center plate 8 is formed integrally with the lower case 3 by the two-color molding or the insert molding, and thereby the number of components of the sliding bearing 1 is reduced and accordingly the assembly costs of the sliding bearing 1 and management costs of the components can be reduced. Further, it is possible to prevent occurrence of defective products owing to forgetting to incorporate the dust-seal-integrated center plate 8.

Further, in the present embodiment, in the lower end surface 64 of the dust seal body 60 of the dust seal part 6 of the dust-seal-integrated center plate 8, the annular protrusion 63 is provided so as to protrude downward in the direction of the axis O from the lower surface 37 of the lower case 3 and to be abutted against the upper spring seat 9 attached to the lower surface 37 of the flange part 32 of the lower case 3 in a state that the dust seal body 60 is fitted to the flange part 32 of the lower case body 31 of the lower case 3. Owing to this, it is possible to prevent intrusion of dust into the gap between the lower surface 37 of the flange part 32 of the lower case 3 and the upper spring seat 9 and thereby to prevent generation of abnormal noise caused by dust that has intruded into the gap between the lower surface 37 of the flange part 32 of the lower case 3 and the upper spring seat 9.

Further, in the present embodiment, the lower case 3 is provided with the through-holes 39 that pass through from the bottom surface 38 of the annular recess 34, on which the center plate part 4 of the dust-seal-integrated center plate 8 is placed, to the lower surface 37 of the flange part 32. And, the protrusions 43 are provided in the back surface 41 of the center plate part 4, and placed in the through-holes 39 of the lower case 3. Accordingly, the area of contact between the dust-seal-integrated center plate 8 and the lower case 3 is enlarged, so that the adhesive strength between the dust-seal-integrated center plate 8 and the lower case 3 can be increased.

Further in the present embodiment, the annular groove 42 for holding the lubricant such as lubricating grease is formed in the bearing surface 40 of the center plate part 4 of the dust-seal-integrated center plate 8, and the annular groove 42 has the inner peripheral surface 420*a* inclined outward in the radial direction from the opening side toward the groove bottom side and the outer peripheral surface 420*b* inclined inward in the radial direction from the opening side toward the groove bottom side. Accordingly, when a load is applied to the sliding bearing 1 so as to press the center plate part 4 against the sliding sheet 5, the inner peripheral surface 420*a* of the annular groove 42 formed in the bearing surface 40 of the center plate part 4 bends inward in the radial direction to come in contact with the sliding surface 51 of the sliding sheet 5, and the outer peripheral surface 420*b* bends outward in the radial direction to come in contact with the sliding surface 51 of the sliding sheet 5. Further, since the intersection P of the inner peripheral surface 420*a* and the outer peripheral surface 420*b* is positioned close to the side of the bearing surface 40 than the back surface 41, the inner peripheral surface 420*a* and the outer peripheral surface 420*b* are inclined gently with respect to a surface perpendicular to the axis O. Accordingly, under a load in the direction of the axis O (load in the thrust direction), the inner peripheral surface 420*a* is easily bendable inward in the radial direction and the outer peripheral surface 420*b* outward in the radial direction. As a result, when the center plate part 4 is pressed against the sliding sheet 5, the area of contact between the center plate part 4 and the sliding sheet 5 becomes larger, and the sealing performance of the lubricant filled in the annular groove 42 is improved. Thereby, even when a biased load is applied to the center plate part 4 and the sliding sheet 5, it is possible to prevent pushing-out of the lubricant on the bearing surface 40 toward the outside and to suppress reduction of the lubricant filled in the annular groove 42. Accordingly, it is possible to maintain the sliding performance over a long period of time.

Further, in the present embodiment, the back surface 41 of the center plate part 4 is a flat surface. Accordingly, when a load is applied to the sliding bearing 1 and the center plate part 4 is pressed against the sliding sheet 5, the center plate part 4 is deformed more largely on the side of the bearing surface 40 than on the side of the back surface 41 of the center plate part 4 and the area of contact between the center plate part 4 and the sliding sheet 5 becomes larger. Therefore, the sealing performance of the lubricant filled in the annular groove 42 is improved further, and accordingly the sliding performance can be maintained over a longer period of time.

Further, in the present embodiment, the annular groove 42 formed in the bearing surface 40 of the center plate part 4 of the dust-seal-integrated center plate 8 has the annular recess 420*c* formed at the intersection P of the inner peripheral surface 420*a* and the outer peripheral surface 420*b*. Owing to the annular recess 420*c*, under a load in the direction of the axis O, the inner peripheral surface 420*a* becomes more bendable inward in the radial direction and the outer peripheral surface 420*b* becomes more bendable outward in the radial direction, so that the sealing performance of the lubricant filled in the annular groove 42 is improved further. Therefore, the sliding performance can be maintained over a longer period of time.

Further, in the present embodiment, as for the annular groove 42 formed in the bearing surface 40 of the center plate part 4 of the dust-seal-integrated center plate 8, the thickness S1 at the opening-side end of the inner peripheral surface 420*a* is larger than the thickness S2 at the opening-side end of the outer peripheral surface 420*b*. Generally, the upper spring seat 9 is a tubular member having a flange 90 formed at one end, and when the upper spring seat 9 is fitted to the lower case body 31 of the lower case 3, the flange 90 is attached to the lower surface 37 of the flange part 32 of the lower case 3. Further, the coil spring (not shown) is designed to have a larger size than the outer diameter of a tubular part 91 (See FIG. 2) of the upper spring seat 9 in order to avoid unnecessary contact with the tubular part 91 of the upper spring seat 9. Accordingly, the abutting position of the upper end of the coil spring against the flange 90 of the upper spring seat 9 comes on the side of the outer periphery of the center plate part 4, and thereby the reaction force of the coil spring is transmitted more to the outer peripheral side of the center plate part 4, or in other words, more to the opening-side end of the outer peripheral surface 420*b* than to the opening-side end of the inner peripheral surface 420*a* in the annular groove 42 formed in the bearing surface 40 of the center plate part 4. However, as described above, since the thickness S1 at the opening-side end of the inner peripheral surface 420*a* is larger than the thickness S2 at the opening-side end of the outer peripheral surface 420*b* of the annular groove 42, the opening-side end of the inner peripheral surface 420*a* is more compressed in comparison with the case where the thickness S1 at the opening-side end of the inner peripheral surface 420*a* is same as the thickness S2 at the opening-side end of the outer peripheral surface 420*b*. That is to say, the obtained amount of compression is as sufficient as at the opening-side end of the outer peripheral surface 420*b*, and thereby the load applied to the bearing surface 40 can be dispersed more uniformly. Accordingly, the sealing performance of the lubricant filled in the annular groove 42 is improved further, and the sliding performance can be maintained over a longer period of time.

The present invention is not limited to the above-described embodiment, and can be varied variously within the scope of the invention.

For example, in the above embodiment, the lower case 3 is provided with a plurality of through-holes 39 arranged in the circumferential direction in such a way that each of the through-holes 39 passes through from the bottom surface 38 of the annular recess 34 to the lower surface 37 of the flange part 32, while the back surface 41 of the center plate part 4 of the dust-seal-integrated center plate 8 is provided a plurality of protrusions 43 arranged in the circumferential direction, so as to be placed into the respective through-holes 39. The present invention, however, is not limited to this. It is sufficient that at least one through-hole 39 is provided in the bottom surface 38 of the annular recess 34 of the lower case 3 and correspondingly at least one protrusion 43 is provided in the back surface 41 of the center plate part 4.

Further, instead of the through-holes 39, an arc-shaped slit, which passes through from the bottom surface 38 of the annular recess 34 to the lower surface of the flange part 32, may be formed along the circumferential direction in the lower case 3, and correspondingly, instead of the protrusions 43, an arc-shaped protrusion, which is placed into the arc-shaped slit, may be formed in the back surface 41 of the center plate part 4 of the dust-seal-integrated center plate 8.

Or, instead of the through-holes 39, a plurality of recesses, each of which is formed along the radial direction in the bottom surface 38 of the annular recess 34, may be provided to be arranged in the circumferential direction, and instead of the protrusions 43, a plurality of protrusions, which have a shape conformed to and are placed in these recesses, may be formed being arranged in the circumferential direction in the back surface 41 of the center plate part 4 of the dust-seal-integrated center plate 8.

Figure 7:
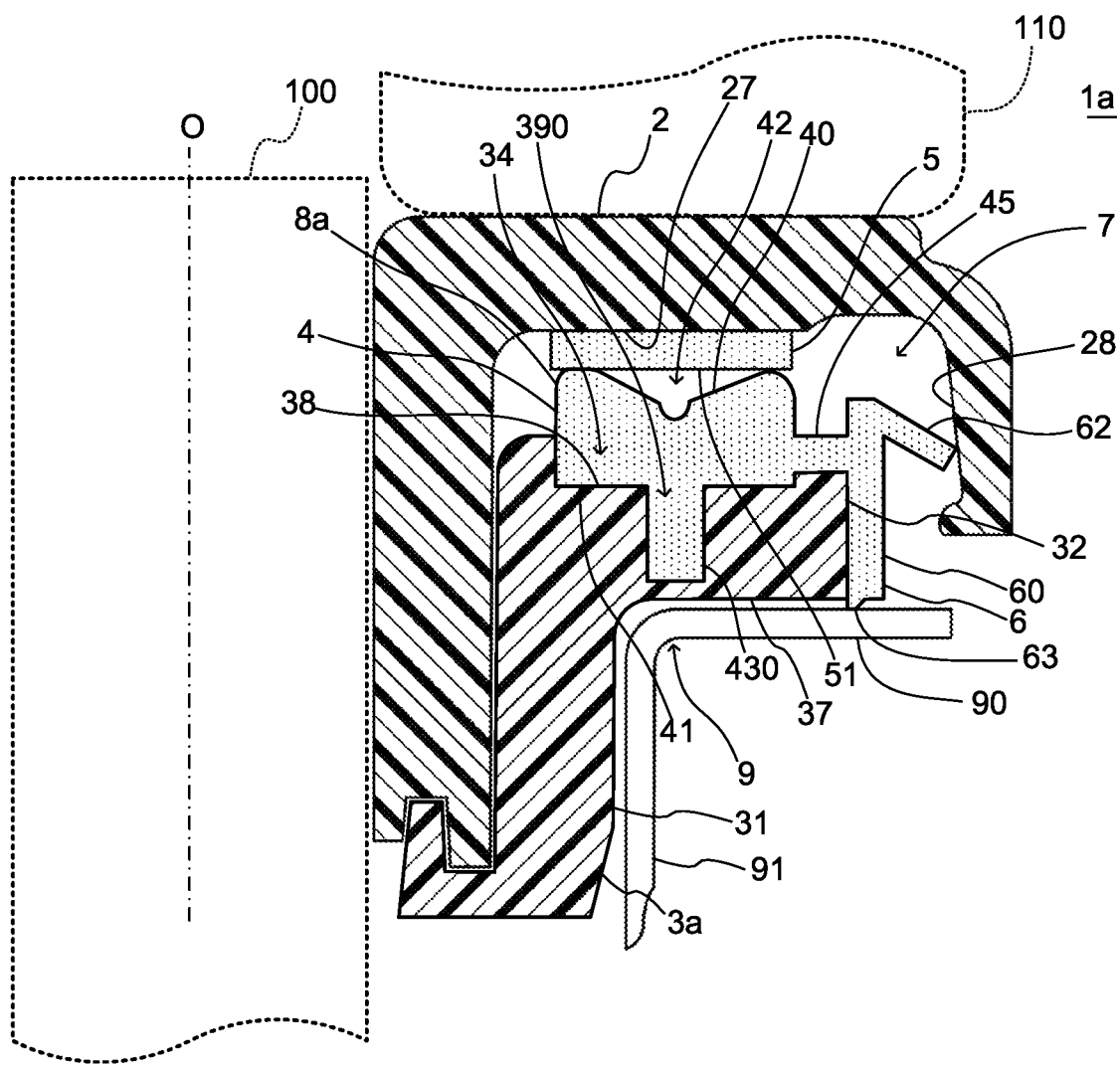
FIG. 7 is a view corresponding to FIG. 2 and shows a variation 1a of the sliding bearing 1.

Or as a variation 1*a* of the sliding bearing 1 shown in FIG. 7, instead of the through-holes 38, at least one recess 390, which does not pass through to the lower surface of the flange part 32, may be provided along the circumferential direction in the bottom surface 38 of the annular recess 34 of the lower case 3*a*, and correspondingly, instead of the protrusions 43, at least one protrusion 430, which is placed in the recess 390, may be provided along the circumferential direction in the back surface 41 of the center plate part 4 of the dust-seal-integrated center plate 8*a*.

Further, in the above embodiment, an annular cutout may be provided in the outer peripheral edge of the lower surface 37 of the flange part 32 of the lower case 3, and an annular protrusion extending inward in the radial direction from the inner peripheral surface may be provided in the dust seal body 60 of the dust seal part 6 of the dust-seal-integrated center plate 8, so that this protrusion is placed in the cutout of the lower case 3. Thereby, the area of contact between the dust-seal-integrated center plate 8 and the lower case 3 is enlarged and the adhesive strength between the dust-seal-integrated center plate 8 and the lower case 3 is improved.

Figure 8:
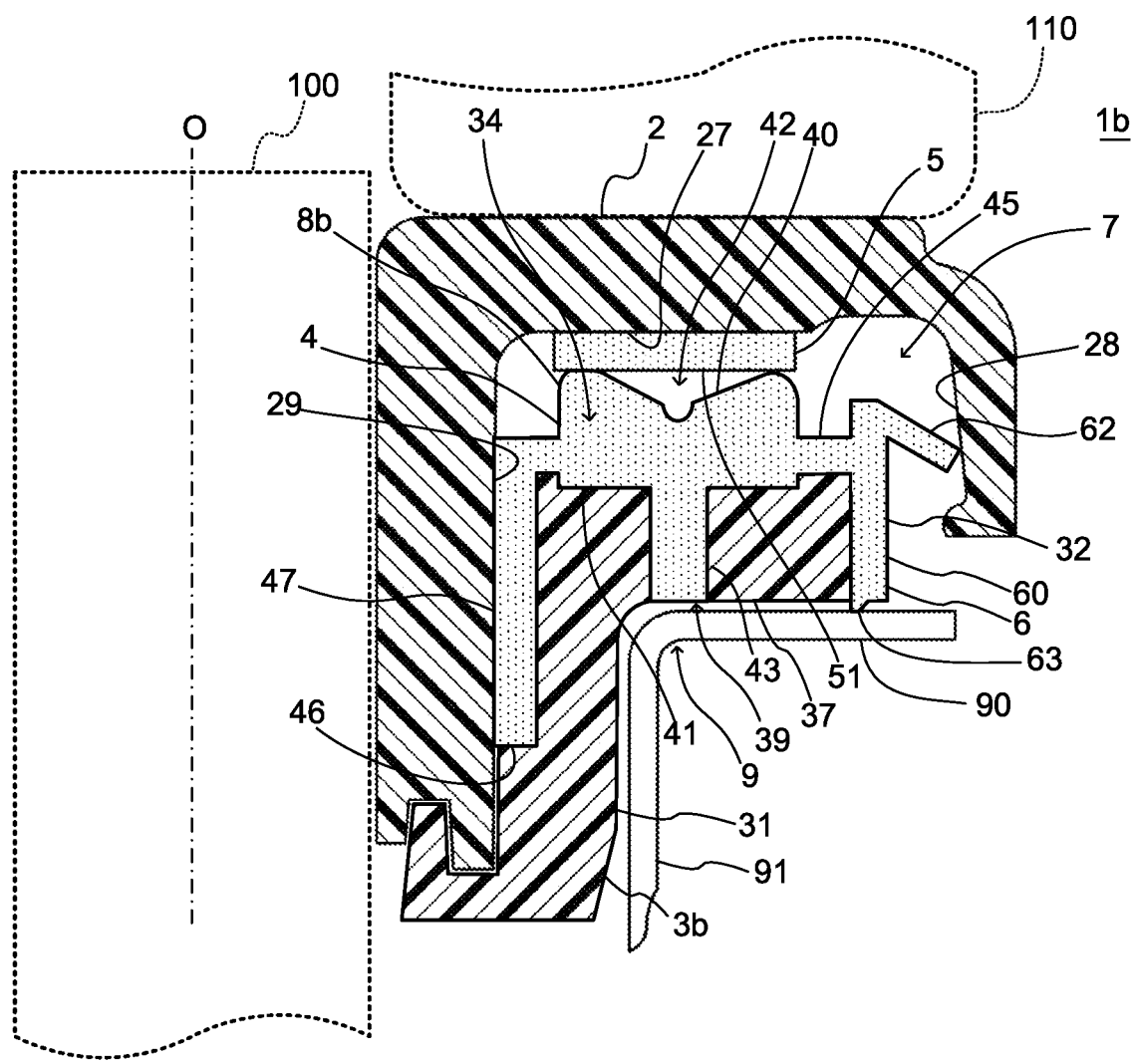
FIG. 8 is a view corresponding to FIG. 2 and shows a variation 1b of the sliding bearing 1.

Further, the above embodiment has been described taking the example where the bearing surface 40 for supporting the load in the thrust direction is provided in the center plate part 4 of the dust-seal-integrated center plate 8. The present invention, however, is not limited to this. As a variation 1b of the sliding bearing 1 shown in FIG. 8, a dust-seal-integrated center plate 8b of the sliding bearing 1 may be provided with a bearing surface 47 for supporting a load in the radial direction in addition to the bearing surface 40 for supporting the load in the thrust direction. That is to say, it is possible to provide a bush part 46 that is connected to the inner peripheral side of the center plate part 4 and placed on the inner peripheral surface of the lower case body 31 of the lower case 3b, so as to form a bearing surface 47 in the inner peripheral surface of the bush part 46 in order to support the load in the radial direction.

Further, the above embodiment has been described taking the example where the dust-seal-integrated center plate 8 is formed integrally with the lower case 3. The present invention, however, is not limited to this. The dust-seal-integrated center plate 8 may be formed integrally with the upper case 2.

Figure 9:
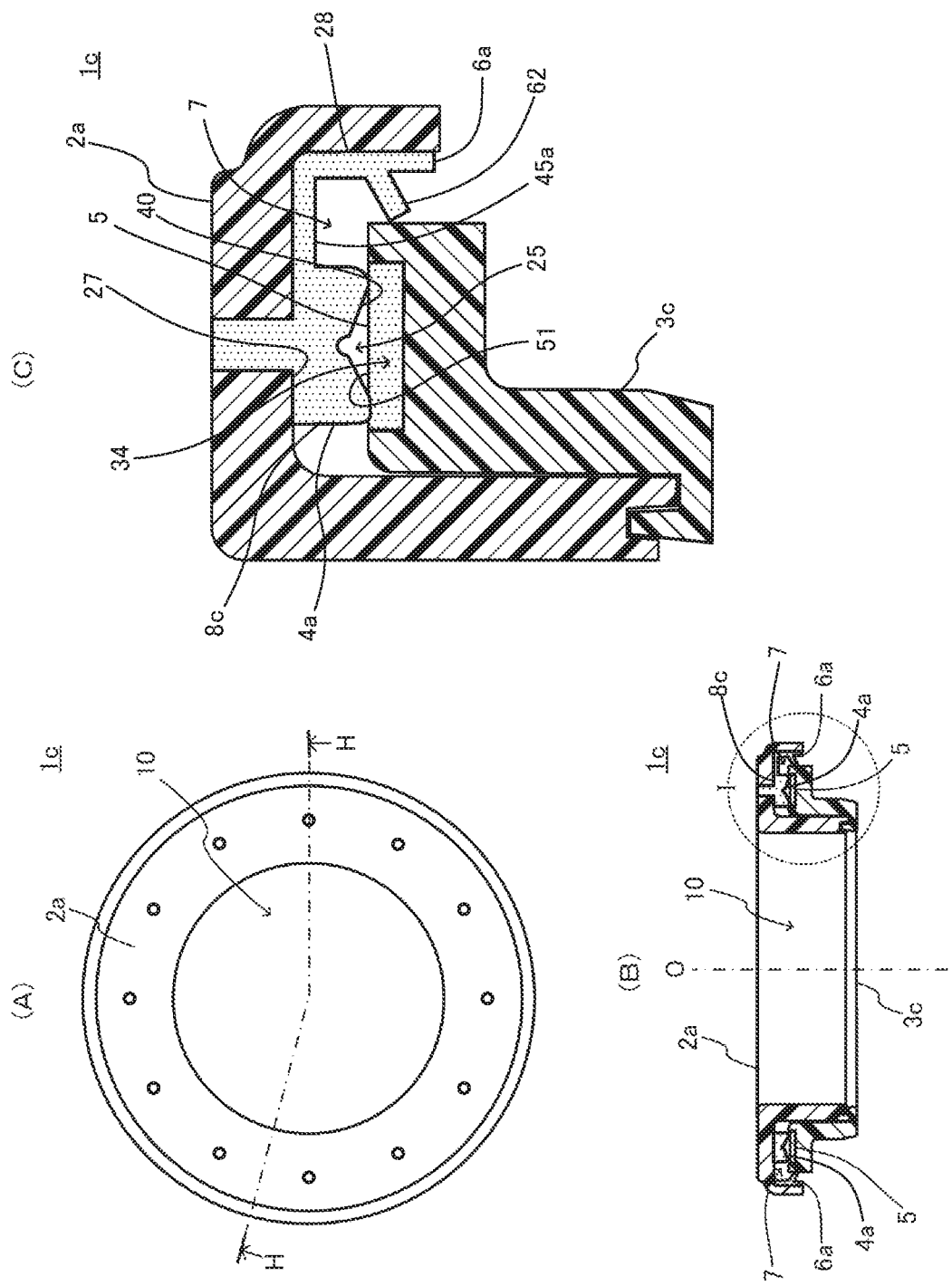
FIG. 9(A) is a plan view of a variation 1c of the sliding bearing 1.
FIG. 9(B) is an H-H cross-section view of the sliding bearing 1c shown in FIG. 9(A)
FIG. 9(C) is an enlarged view of the part I of the sliding bearing 1c shown in FIG. 9(B)

For example, in a variation 1c of the sliding bearing 1 shown in FIG. 9, a dust-seal-integrated center plate 8c is formed integrally with an upper case 2a. A center plate part 4a and a dust seal part 6a of the dust-seal-integrated center plate 8c are connected with each other by arm parts 45a. The center plate part 4a is placed on a load transmission surface 27 of an annular recess 25 of the upper case 2a in such a way that a bearing surface 40 of the center plate part 4a faces downward. The dust seal part 6a is placed on an outer-peripheral-side inner wall 28 of the annular recess 25 of the upper case 2a, with a lip part 62 being directed inward in the radial direction. Further, a sliding sheet 5 is placed in an annular recess 34 of a lower case 3c in such a way that a sliding surface 51 faces the bearing surface 40 of the center plate part 4a.

In the case where the dust-seal-integrated center plate 8c is formed integrally with the upper case 2a, the material of the lower case 3c may be impregnated with lubricating oil as needed, in order to improve the sliding characteristics. On the other hand, it is not necessary to impregnate the material of the upper case 2a with lubricating oil in order to improve the sliding characteristics.

Further, the above embodiment has been described taking the example of using the dust-seal-integrated center plate 8 in which the center plate part 4 and the dust seal part 6 are integrated as one part by connecting the center plate part 4 and the dust seal part 6 through the arm parts 45. The present invention, however, is not limited to this. It is possible that each of the center plate part 4 and the dust seal part 6, as a separate part, is formed integrally with the lower case 3 or the upper case 2.

Further, the above embodiment has been described taking the example where the radial width of the bottom surface 38 of the annular recess 34 of the lower case 3 is same as the radial width of the opening side (on the side of the upper surface 33 of the flange part 32) of the annular recess 34. The present invention, however, is not limited to this. As a variation 1d of the sliding bearing 1 shown in FIG. 10, it is possible to form an annular recess 34a to have a dovetail shape by making the radial width of the bottom surface 38 of the annular recess 34a of a lower case 3d wider than the opening-side radial width of the annular recess 34a, while forming an engaging part 48 in a center plate part 4b so as to engage with the annular recess 34a of the dovetail shape. Thereby, the center plate part 4b can structurally engage with the lower case 3d, to prevent more efficiently the center plate part 4b from coming off the lower case 3d.

Figure 10:
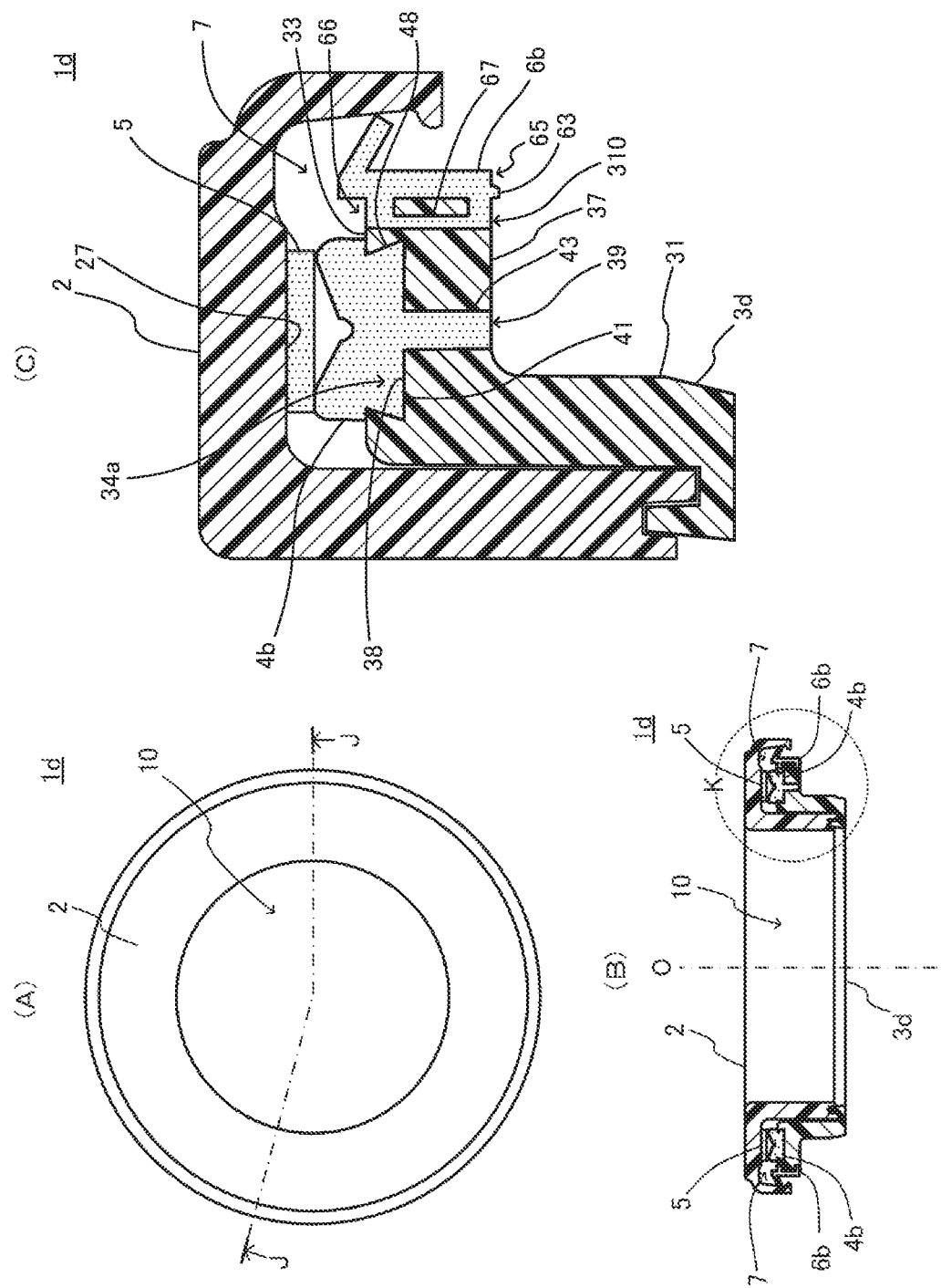
FIG. 10(A) is a plan view of a variation 1d of the sliding bearing 1.
FIG. 10(B) is a J-J cross-section view of the sliding bearing 1d shown in FIG. 10(A)
FIG. 10(C) is an enlarged view of the part K of the sliding bearing 1d shown in FIG. 10(B).

In the variation 1d of the sliding bearing 1 shown in FIG. 10, at least one slit 310 is provided along the circumferential direction to pass through from the upper surface 33 to the lower surface 37 of the flange part 32 of the lower case 3d, so that an engaging part 67 connected to the upper end 66 and the lower end 65 of the dust seal body 60 of a dust seal part 6b is placed in this slit 310. Thereby, the dust seal part 6b can structurally engage with the slit 310 of the lower case 3d and prevent more efficiently the dust seal part 6b from coming off the lower case 3d.

In the variation 1d of the sliding bearing 1 shown in FIG. 10, each of the center plate part 4b and the dust seal part 6b as a separate part is formed integrally with the lower case 3d. However, similarly to the above embodiment, it is possible to form the center plate part 4b and the dust seal part 6b as a dust-seal-integrated center plate integrated as one part by connecting the center plate part 4b and the dust seal part 6b by arm parts 45. In this case, instead of the dust seal part 6b, even if by using a dust seal part 6 of a shape without the engaging part 67, it is also possible to prevent efficiently the dust-seal-integrated center plate from coming off the lower case 3d.

The present invention can be widely applied to sliding bearings for supporting a load in various mechanisms including a suspension for a vehicle.

REFERENCE SIGNS LIST 1, 1a, 1b, 1d: sliding bearing; 2, 2a: upper case; 3, 3a, 3b, 3c, 3d: lower case; 4, 4a, 4b: center plate part; 5: sliding sheet; 6, 6a, 6b: dust seal part; 7: annular space; 8, 8a, 8b, 8c: dust-seal-integrated center plate; 9: upper spring seat; 10: receiving hole of the sliding bearing 1; 20: insertion hole of the upper case 2; 21: upper case body; 22: upper surface of the upper case body 21; 23: attaching surface of the upper case body 21; 24: lower surface of the upper case body 21; 25: annular recess of the upper case body 21; 26: bottom surface of the annular recess 25; 27: load transmission surface of the upper case 2; 28: outer-peripheral-side inner wall of the annular recess 25; 30: insertion hole of the lower case 3; 31: lower case body; 32: flange part of the lower case body 31; 33: upper surface of the flange part 32; 34, 34a: annular recess of the lower case body 31; 35: upper end of the lower case body 31; 36: outer peripheral surface of the lower case body 31; 37: lower surface of the flange part 32; 38: bottom surface of the annular recess 34; 39: through hole; 40: bearing surface of the center plate part 4, 4a; 41: back surface of the center plate part 4, 4a; 42: annular groove of the bearing surface 40; 43: protrusion of the center plate part 4; 45, 45a: arm part; 46: bush part; 47: bearing surface of the bush part 46; 48: engaging part of the center plate part 4b; 60: dust seal body of the dust seal part 6; 61: outer peripheral surface of the dust seal body 60; 62: lip part of the dust seal part 6, 6a; 63: annular protrusion of the dust seal part 6; 64: lower end surface of the dust seal part 6; 65: lower end of the dust seal body 6; 66: upper end of the dust seal body 60; 90: flange of the upper spring seat 9; 91: tubular part of the upper spring seat 9; 310: slit of the lower case 3*d*; 340: cutout of the lower case 3, 3*a*, 3*b*; 390: recess of the lower case 3*a*; 420*a*: inner peripheral surface of the bearing surface 40; 420*b*: outer peripheral surface of the bearing surface 40; 420*c*: annular recess of the bearing surface 40; and 430: protrusion of the center plate part 4.

The invention claimed is:

1. A sliding bearing for supporting a load, comprising:
an upper case;
a lower case, which is combined with the upper case; and
an annular center plate, which is placed between the upper case and the lower case, to support relative rotation between the upper case and the lower case,
wherein:
the center plate is formed integrally with the lower case or the upper case and has:
a bearing surface; and
an annular groove, which is formed in the bearing surface so as to hold a lubricant; and
the annular groove has:
an inner peripheral surface inclined outward in a radial direction from an opening side toward a groove bottom side;
an outer peripheral surface inclined inward in a radial direction from the opening side toward the groove bottom side; and
an annular recess positioned at a location where imaginary extension lines of the inner peripheral surface and the outer peripheral surface intersect.

2. A sliding bearing according to claim 1, wherein:
the lower case or the upper case, which is formed integrally with the center plate, has a through-hole that passes through from a surface facing the center plate to a surface on an opposite side to the facing surface; and
the center plate has a protrusion that is placed in the through-hole of the lower case or the upper case formed integrally with the center plate.

3. A sliding bearing according to claim 2, wherein:
the lower case or the upper case formed integrally with the center plate has a dovetail-shaped annular recess formed in the surface facing the center plate; and
the center plate has an engaging part that engages with the annular recess of the lower case or the upper case formed integrally with the center plate.

4. A sliding bearing according to claim 3, further comprising a dust seal, which closes a gap between the upper case and the lower case, wherein:
the dust seal is formed integrally with the lower case or the upper case together with the center plate.

5. A sliding bearing according to claim 2, further comprising a dust seal, which closes a gap between the upper case and the lower case, wherein:
the dust seal is formed integrally with the lower case or the upper case together with the center plate.

6. A sliding bearing according to claim 1, wherein:
the lower case or the upper case formed integrally with the center plate has a recess that is provided in a surface facing the center plate; and
the center plate has a protrusion that is placed in the recess of the lower case or the upper case formed integrally with the center plate.

7. A sliding bearing according to claim 6, wherein:
the lower case or the upper case formed integrally with the center plate has a dovetail-shaped annular recess formed in the surface facing the center plate; and
the center plate has an engaging part that engages with the annular recess of the lower case or the upper case formed integrally with the center plate.

8. A sliding bearing according to claim 6, further comprising a dust seal, which closes a gap between the upper case and the lower case, wherein:
the dust seal is formed integrally with the lower case or the upper case together with the center plate.

9. A sliding bearing according to claim 1, wherein:
the lower case or the upper case formed integrally with the center plate has a dovetail-shaped annular recess formed in the surface facing the center plate; and
the center plate has an engaging part that engages with the annular recess of the lower case or the upper case formed integrally with the center plate.

10. A sliding bearing according to claim 9, further comprising a dust seal, which closes a gap between the upper case and the lower case, wherein:
the dust seal is formed integrally with the lower case or the upper case together with the center plate.

11. A sliding bearing according to claim 1, further comprising a dust seal, which closes a gap between the upper case and the lower case, wherein:
the dust seal is formed integrally with the lower case or the upper case together with the center plate.

12. A sliding bearing according to claim 11, wherein:
the lower case has a lower surface, which faces and supports a spring seat; and
the dust seal has an annular protrusion, which protrudes in an axial direction beyond the lower surface of the lower case, and closes a gap between the lower surface and the spring seat.

13. A sliding bearing according to claim 1, further comprising an annular sliding sheet, which is placed between the center plate and the lower case or the upper case that is not formed integrally with the center plate.

14. A sliding bearing according to claim 1, wherein:
the sliding bearing supports a load applied to a shock absorber while allowing rotation of the shock absorber;
the upper case is attached to an upper mount in a state that the shock absorber is inserted in the upper case;
the lower case is combined with the upper case in a state that the shock absorber is inserted in the lower case; and
the center plate is placed between the upper case and the lower case in a state that the shock absorber is inserted in the center plate, and supports relative rotation between the upper case and the lower case.

* * * * *